United States Patent
van Doorn et al.

(10) Patent No.: US 10,101,893 B1
(45) Date of Patent: Oct. 16, 2018

(54) DOCUMENT FEEDBACK TRACKING

(71) Applicant: Amazon Technologies, Inc., Seattle, WA (US)

(72) Inventors: Ivo van Doorn, The Hague (NL); Floor Mesters, The Hague (NL)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 14/575,178

(22) Filed: Dec. 18, 2014

(51) Int. Cl.
*G06F 3/00* (2006.01)
*G06F 3/0484* (2013.01)
*H04L 12/58* (2006.01)

(52) U.S. Cl.
CPC ...... *G06F 3/04847* (2013.01); *G06F 3/04842* (2013.01); *H04L 51/046* (2013.01)

(58) Field of Classification Search
CPC . G06F 3/04847; G06F 3/04842; H04L 51/046
See application file for complete search history.

(56) References Cited

U.S. PATENT DOCUMENTS

| | | | | |
|---|---|---|---|---|
| 5,008,853 A * | 4/1991 | Bly | ................... | G06F 17/30171 345/2.1 |
| 7,302,674 B1 * | 11/2007 | Gladieux | ............... | G06Q 10/06 707/999.104 |
| 7,392,280 B2 * | 6/2008 | Rohall | ................. | G06Q 10/107 709/201 |
| 2002/0143691 A1 * | 10/2002 | Ramaley | ................ | G06Q 40/04 705/37 |
| 2005/0097440 A1 * | 5/2005 | Lusk | ...................... | G06Q 10/10 715/758 |
| 2006/0184865 A1 * | 8/2006 | Chakraborty | .......... | G06Q 10/10 715/209 |
| 2006/0265398 A1 * | 11/2006 | Kaufman | ................ | G06F 17/24 |
| 2008/0046518 A1 * | 2/2008 | Tonnison | ............. | G06Q 10/107 709/206 |
| 2010/0280962 A1 * | 11/2010 | Chan | .................... | G06Q 10/103 705/301 |
| 2011/0252103 A1 * | 10/2011 | Beyer | ................. | G06Q 10/107 709/206 |
| 2011/0276897 A1 * | 11/2011 | Crevier | ............... | G06Q 10/107 715/752 |
| 2012/0284344 A1 * | 11/2012 | Costenaro | ............. | G06F 17/241 709/206 |
| 2014/0033069 A1 * | 1/2014 | Chegini | ................ | G06Q 10/10 715/751 |
| 2015/0317073 A1 * | 11/2015 | Hull | ....................... | H04W 4/21 715/753 |

OTHER PUBLICATIONS

Joan Lambert and Joyce Cox, "MOS 2010 Study Guide for Microsoft Outlook," Sep. 22, 2011, Microsoft Press, "Attach Content to Email Messages" section.*

* cited by examiner

*Primary Examiner* — Dino Kujundzic
(74) *Attorney, Agent, or Firm* — Baker & Hostetler LLP

(57) ABSTRACT

A selected email message is displayed within an email client. The display includes a user-selectable control for requesting status of an attached document from a document management and collaboration system. In response to receiving an input via the user-selectable control, reviewers associated with the attached document are identified. Status of whether the reviewers have reviewed the attached document and to what extent the reviewers have reviewed the attached document are determined. The status is displayed within the email client.

20 Claims, 10 Drawing Sheets

DOCUMENT FEEDBACK TRACKING

BACKGROUND

Email has become one of the primary technologies people rely upon to communicate. Organizations of all types and sizes use email to communicate both internally and externally. Individuals have widely adopted email for personal use.

With the increased volume of emails has come a greater breadth of topics discussed by way of email. At one time, email was used to address limited business or personal issues. However, email is now used to converse regarding virtually every aspect of users' business and personal lives.

Organizations may also utilize a document management and collaboration system to enable users to share documents and collaborate on the documents. Various users may view, change, or annotate documents. Users may also comment on or provide feedback on documents and create or delete documents.

BRIEF DESCRIPTION OF DRAWINGS

The following description of the illustrative embodiments may be better understood when read in conjunction with the appended drawings. It is understood that potential embodiments of the disclosed systems and methods are not limited to those depicted.

DETAILED DESCRIPTION

Figure 1:
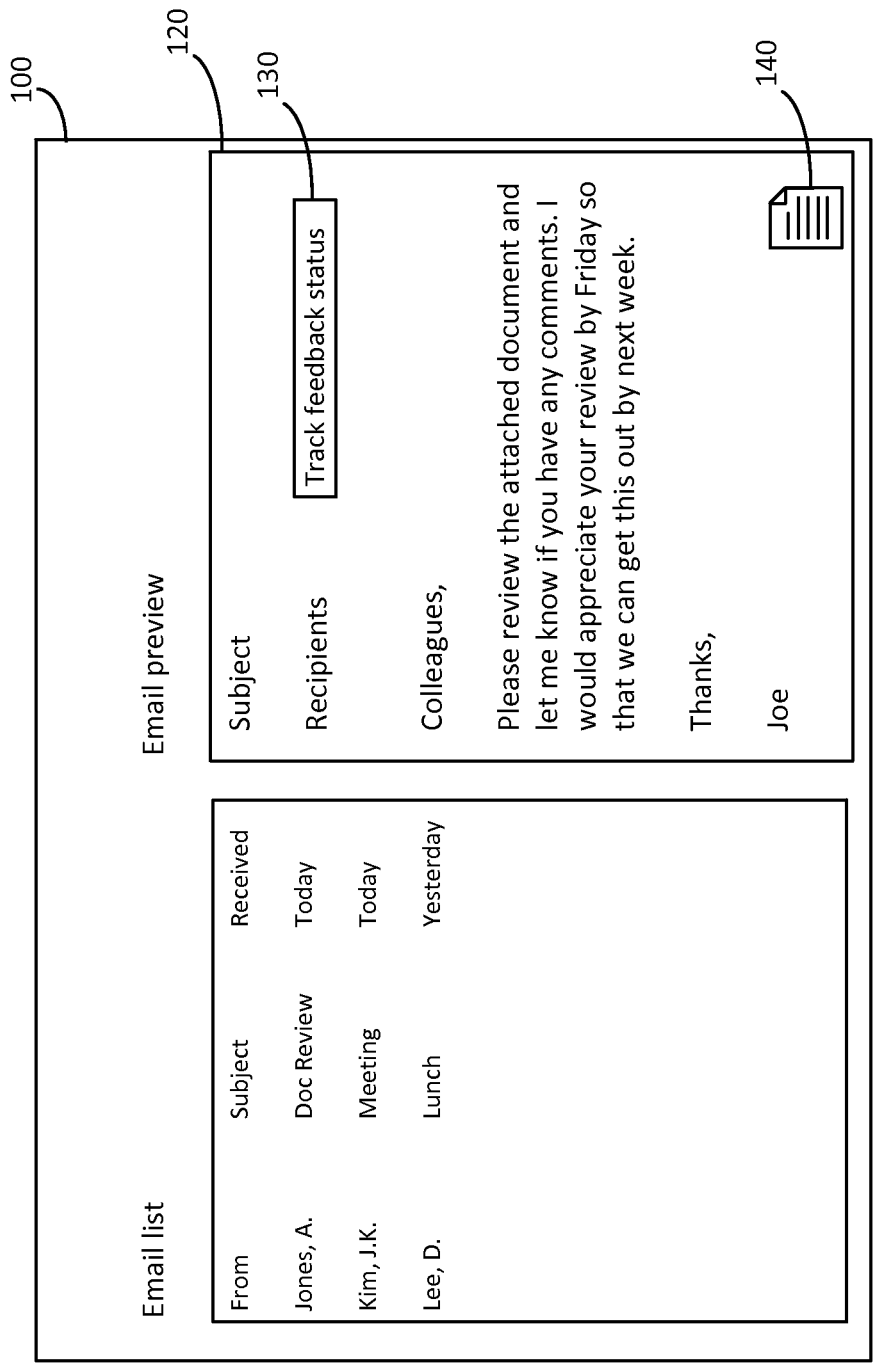
FIG. 1 depicts an example graphical user interface for use in providing document status.

The large number of emails that are received in users' inboxes and the wide variety of topics to which the received emails relate have resulted in the practical need to organize emails. One email feature that helps to address this need is the capability to group emails into email conversations. A group containing an email and the replies to the particular email may be referred to as an email conversation or email thread. Viewing emails and replies to emails in a group, i.e., as an email conversation, allows users to put received emails into context.

Groups that use email may also utilize a document management and collaboration system to enable users to share documents and collaborate on the documents. For example, users may send a reference to a document to one or more requested reviewers of the document. However, the functionality offered by existing systems relating to document sharing and collaboration is limited. Typically, it is cumbersome to efficiently request and review feedback for a shared document.

Disclosed herein are systems and methods for providing an overview of the reviewers of a shared document and which of the reviewers have provided feedback for the document. The disclosed systems and methods allow email users the option to view, within an email conversation, a list of the recipients of a shared document of a document management and collaboration system and their feedback statuses, without having to directly access the document management and collaboration system.

According to an aspect of the disclosed embodiments, the user is not required to launch or access the document management and collaboration system, and instead the email client obtains the information from the document management and collaboration system and displays the information within the email client. In an example embodiment, the user interface is adapted to present an option to view the status of a message or an email conversation in order to view the feedback status of a document for which feedback has been requested. If a request for feedback status is entered by the user, then the email client may communicate with the document management and collaboration system and obtain information regarding the document feedback status. In one embodiment, the email client may provide a list of requested reviewers and their individual review statuses. The individual review status can include, for example, "opened," "reviewed," and "approved."

In some embodiments, an API may be provided to request status of a document. A requestor may send an API request with an identifier for the document. Additionally and optionally, the request may include user IDs for reviewers associated with the document. Alternatively, the document management and collaboration system can determine user IDs for reviewers who are associated with the document.

The email client may obtain an identifier corresponding to a document in the document management and collaboration system, an identifier for an email or email conversation associated with the request for feedback and identifiers for the reviewers associated with the request for review. In an example embodiment, the reviewers may collectively be identified with a group identifier. When the email client requests document feedback status, the email client may provide a document ID, an email ID, one or more reviewer IDs, and/or a group ID. Subsequently, the email client may identify information pertaining to the status request with the various IDs.

Referring to FIG. 1, an example window 100 of an email client is depicted. The window 100 may be generated by an email client executing on a user's computing device. The window 100 may include a list of emails, along with a view 120 of a selected email from the list of emails. The view 120 may also include a user selectable control 130 for tracking feedback status. The user selectable control 130 may be a button or some other interface element for receiving an indication of a command by the user via a user interface. The view 120 can also show an attachment indicator 140, which indicates that there is an attachment associated with the selected email. In some cases, the attachment comprises a file that is stored with the email message. In other cases, the attachment comprises a link to another resource, such as a remotely stored file, and the attachment is not necessarily stored with the email message. In particular embodiments, the link is to a file stored in a document management and collaboration system, cloud storage system, or network storage system, the Internet, or in another location. The link can be provided to the email client and/or to an email system by the system storing the document. The email client can comprise, for example, an application running on a computing device, or a browser-based application running in a web browser.

Figure 2:
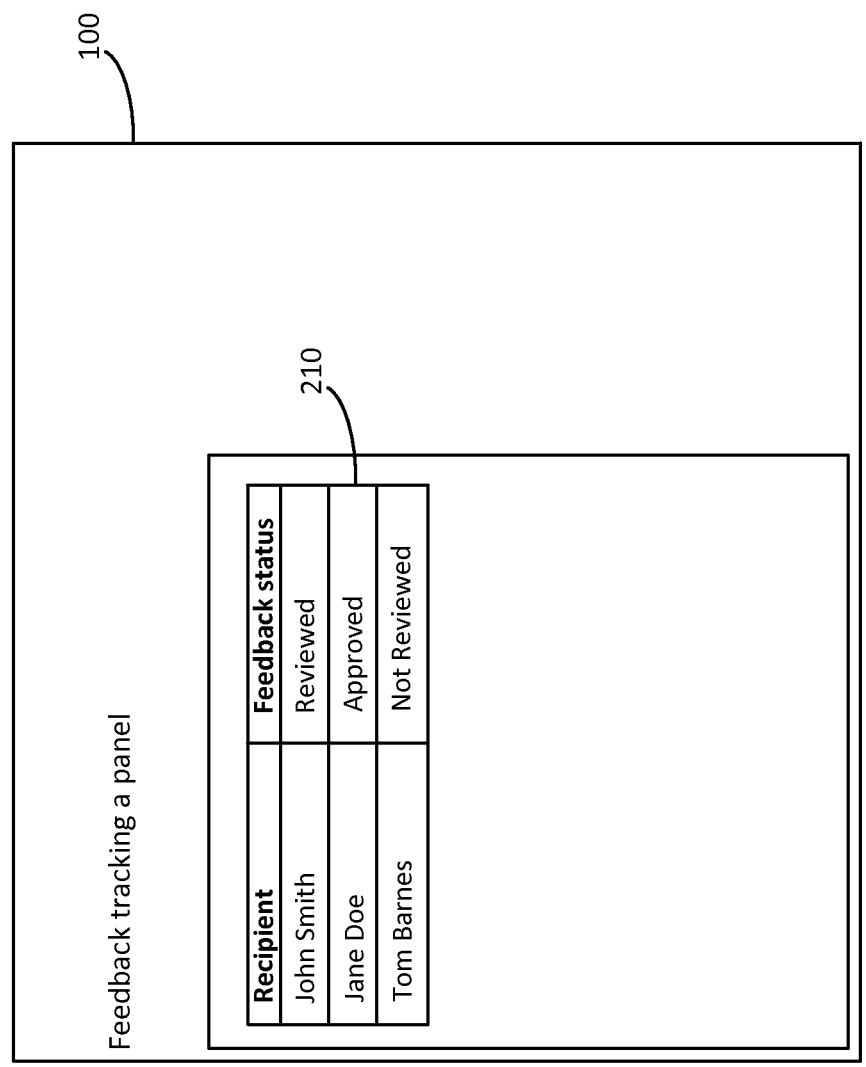
FIG. 2 depicts an example graphical user interface for use in providing document status.

Referring to FIG. 2, illustrated is a feedback tracking panel 210 rendered within window 100. In one embodiment, the feedback tracking panel 210 may include a list of recipients for a document and their corresponding review status. The list of recipients may include first and last names and/or a user identifier such as an email address (not shown). The review status may include status identifiers that indicate whether the recipient has opened the document, reviewed the document, provided comments, or approved the document. The review status may also include the extent to which a document has been reviewed (e.g.: 0% reviewed, 25% reviewed, 75% reviewed, 100% reviewed; or, not reviewed, partially reviewed, mostly reviewed, completely reviewed; ¼, ½, ⅔, ¾, 1/1).

Although FIGS. 1 and 2 illustrate an example with one email message with a single document, the described feedback tracking panel may be provided for multiple documents and groups of recipients.

Figure 3:
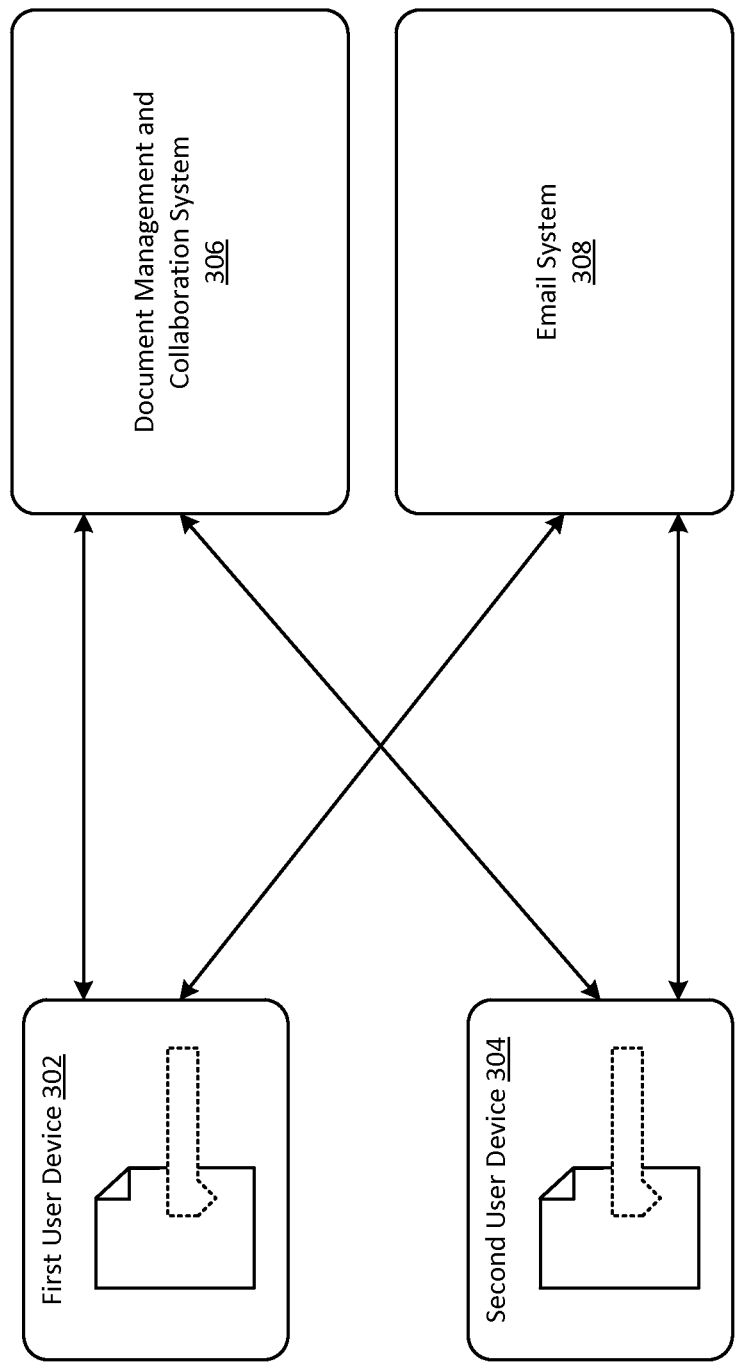
FIG. 3 shows a user device in communication with a computing resource service provider in accordance with at least one embodiment.

FIG. 3 shows an example of email and document collaboration in accordance with at least one embodiment. A first user device 302 and a second user device 304 are connected to a document management and collaboration system 306 and an email system 308. The document management and collaboration system 306 enables the user devices to share documents and collaborate on the documents. Further, the document management and collaboration system 306 enables the two user devices to be synchronized such that texts, commentaries, annotations, or highlighting that are provided by the first user device 302 may be viewed by the second user device 304. Synchronization between user devices may be performed in real time or semi-continuously, periodically, or may be event-driven or event-triggered, whereby the event may be any type of user command, such as storing a document under collaboration. The email system 308 allows first user device 302 and second user device 304 to send and receive electronic messages and send attachments or links to documents using the document management and collaboration system 306.

The email system 308 may be used to send a request to one or more recipients to access a document (not shown) from the document management and collaboration system 306 and review or approve the document. The request may originate from a user (not shown) associated with the first user device 302 or second user device 304. The document that is to be reviewed may be accessed by first user device 302 or second user device 304 via the document management and collaboration system 306. The document management and collaboration system 306 may track the status of reviews performed by various users who access the document.

As described herein, the term "user" may refer to a human-operated computing device that is equipped with communication and computing capability. The term "document" may be any type of media, such as audio-visual media, that is capable of being rendered on a computing device. A document may be a computer file that is capable of being produced by, edited, or viewed using a productivity program or suite. Accordingly, the document may be editable or non-editable text, images, drawings, and websites, among others. In addition to enabling users to collaborate and share documents, the document management and collaboration system 306 may provide users with file systems or organizational structures to manage the documents. The organizational structures may include directories having nested folders and subfolders of documents and may be accessible to the users and utilized by the users as a way to access documents.

Figure 4:
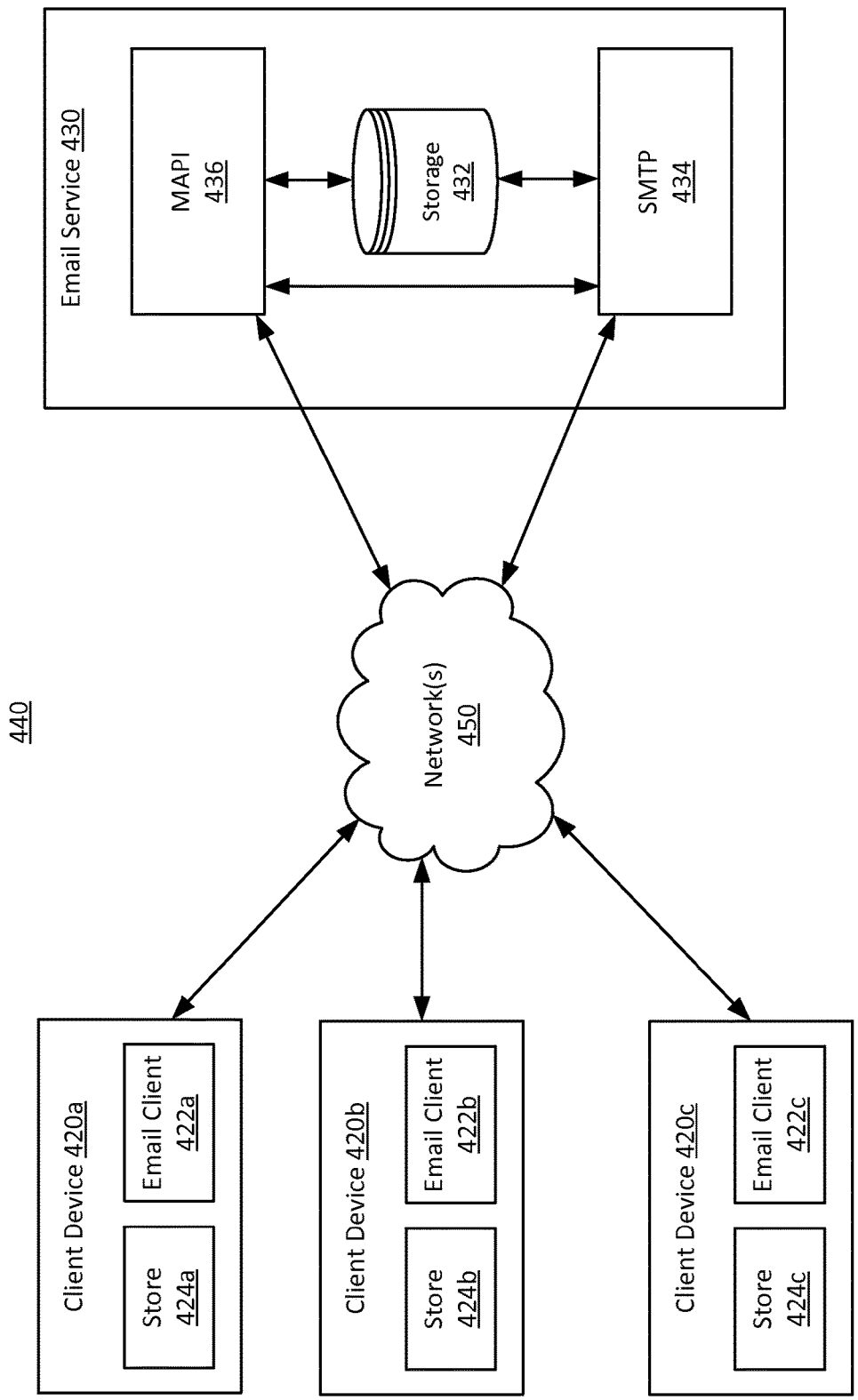
FIG. 4 shows an example email system in accordance with at least one embodiment.

FIG. 4 is a diagram illustrating an example email system 440 that may be used in some embodiments. Email system 440 comprises email service 430, which provides functionality for sending and receiving emails. Users (not shown) employ client devices 420a-c to interface with email service 430 via network 450. Using client devices 420a-c, users are able to perform operations traditionally associated with email systems, such as, for example, creating and sending emails. In addition, and as disclosed herein, using client devices 420a-c, users are also able to link email conversations, link received emails to email conversations, and create links between new emails and existing email conversations.

Email service 430 comprises storage server 432 adapted to store and retrieve data including, for example, emails and data relating to those emails. As emails are received at email service 430, and as emails are created and sent, those emails may be stored in storage 432. In an example embodiment, the emails are organized into mailboxes, with each mailbox associated with an email user. The mailboxes may be stored in any suitable manner by storage functionality 432. In an example embodiment, user mailboxes and emails comprised therein may be stored in one or more files, which may be, for example, text files. According to another embodiment, user mailboxes and emails may be stored in random access memory. Storage 432 may be implemented using any suitable technology including, for example, computing memory and relational database software.

Simple Mail Transfer Protocol (SMTP) server 434 is adapted to send or transmit emails from email service 430 and to receive emails into email service 430 from other email systems via network 450. SMTP server 434 interfaces with storage server 432 via any suitable networking technology to store and retrieve email data. It will be appreciated that while in the example embodiment of FIG. 4 the simple mail transfer protocol (SMTP) is depicted as providing an email interface with external email systems, other protocols might also be employed to interface with external email systems.

Messaging Application Programming Interface (MAPI) 436 provides interface functionality between client devices 420a-c and email service 430. MAPI 436 allows client devices 420a-c to retrieve emails from email service 430 and to communicate new emails authored at client devices 420a-c to email service 430 for communication to others. In an example scenario, MAPI 436 may receive requests from client devices 420a-c, and more particularly from email clients 422a-c, to retrieve emails for particular users. In response, MAPI may interface with storage 432 to retrieve responsive email data, including email header, bodies, and attachments, and communicate the retrieved data via network 450 to the requesting client. In another scenario, MAPI 436 may receive requests from email clients 422a-c to send emails, in response to which MAPI 436 interfaces with storage 432 and SMTP server 434 to have requested emails transmitted. MAPI 436 interfaces with storage server 432 and SMTP server 434 via any suitable networking technology to store and retrieve email data. It will be appreciated that while in the example embodiment depicted in FIG. 4 the MAPI protocol is depicted as providing interface functionality with client devices 420a-c, other protocols, such as IMAP and/or POP, may alternatively or additionally be employed.

Client devices 420a-c may be any that are suitable to access email service 430 in order to review email inboxes and to prepare and send emails. By way of example, client devices 420a-c may be desktop computers, laptop computers, tablet computers, wireless phones, personal digital assistants, media players, etc. While only three devices are illustrated in FIG. 4, it is understood that email service 430 may be accessed by any number of computing devices.

In the example embodiment depicted in FIG. 4, each of client devices 420a-c comprise email client 422. Email clients 422a-c are adapted to perform user-directed functionality of the emailing process. For example, email clients 422a-c are adapted to retrieve emails from email service 430, to display emails, to provide a user interface for organizing and preparing emails, and to transmit prepared emails to email service 430. As described herein, email clients 422a-c may also be adapted to allow groups of emails or email conversations to be linked to each other, to link received emails to email conversations, and to create links between new emails and existing email conversations. Email clients 422a-c interface with data stores 424a-c to store and retrieve email data including email header information. Email clients 422a-c may also store in data stores 424a-c information identifying links that the user of the particular device has created between email conversations and between emails and email conversations.

Although the functionality provided by the email clients 422a-c may be the same or similar as between client devices 420a-c, the email clients 422a-c may vary between devices. For example, the email clients 422a-c may be different so as to accommodate the different computing architectures of individual client devices 420a-c. In an illustrative scenario, email client 422a may be running a WINDOWS operating system, email client 422b may be running on an APPLE operating system, and email client 422c may be running on an Android operating system. In another scenario, email client 422 may be a web client generated via communications with email service 430. Although the exact implementation of email client functionality may vary as between email clients, the basic email client functionalities, such as receiving emails, sending emails, and reviewing received emails, are provided. As described herein, email clients 422a-c further support the linking of email conversations. MAPI 436 is adapted to interface with the various different hardware and software combinations comprised in email clients 422.

Email service 430 is accessible to client devices 420a-c and external email services via communications network 450. Communications network 450 may be any type of network that is suitable for providing communications between client devices 420a-c and email service 430. Moreover, communications network 450 may comprise a combination of discrete networks, which may use different technologies. For example, communications network 450 may comprise local area networks (LANs), wide area networks (WANs), cellular networks, or combinations thereof. Communications network 450 may comprise wireless, wireline, or combination thereof. In an exemplary embodiment, communications network 450 comprises the Internet and may additionally comprise any networks adapted to communicate with the Internet.

Email system 440 may employ a host of network topologies, such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computing device, such as one of the client devices 420a-c that accesses shared network resources, such as email service 430, that is provided by other computers (i.e., servers). A server is typically a remote computer system accessible over a remote network, such as the Internet. The client process may be active in a first computer system, and the server process may be active in a second computer system-communicating with one another over a communications medium and allowing multiple clients to take advantage of the information-gathering capabilities of the server.

Clients and servers communicate with one another utilizing the functionality provided by a protocol layer. For example, Hypertext-Transfer Protocol (HTTP) is a common protocol that is used in conjunction with the World Wide Web (WWW) or, simply, the "web." Typically, a computer network address, such as a Uniform Resource Locator (URL) or an Internet Protocol (IP) address, is used to identify the server or client computers to each other. Communication among computing devices is provided over a communications medium. In particular, the client and server may be coupled to one another via TCP/IP connections for high-capacity communication.

Figure 5:
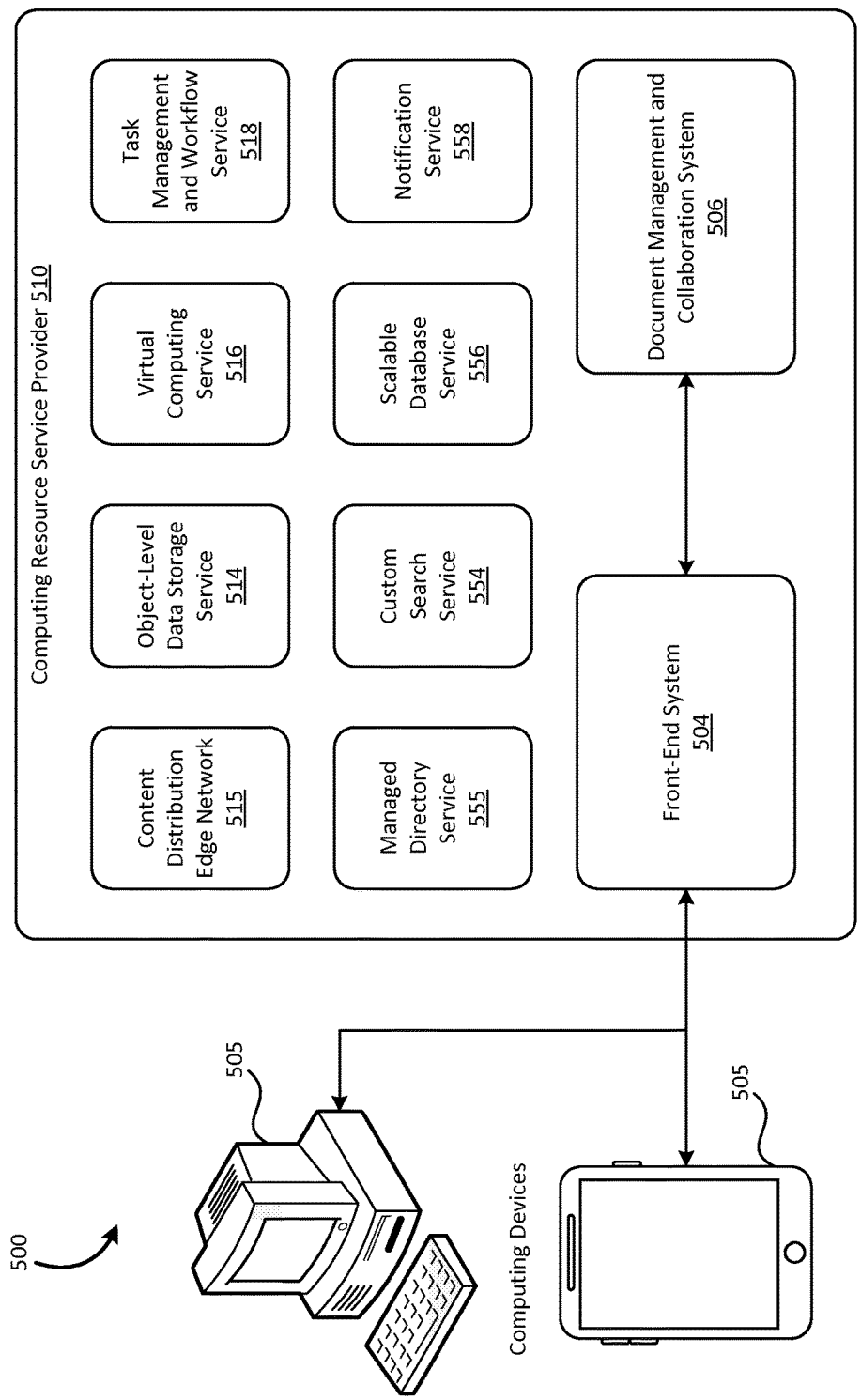
FIG. 5 shows user devices in communication with a computing resource service provider in accordance with at least one embodiment.

FIG. 5 shows an example of computing devices connected to a computing resource service provider in accordance with at least one embodiment. The computing devices 505 may be any device that is capable of communicating with the computing resource service provider 510 or its entities. The computing devices 505 may also be equipped with local or remote (for example, network-based) computational and storage capabilities. The computational capabilities may be provided or enabled by a processor, such as a central processing unit (CPU), graphics processing unit (GPU), digital signal processor, and the like. Examples of CPUs include CPUs that employ an x86 architecture (for example, as used in desktop and laptop computing devices) or a reduced instruction set computing (RISC) architecture (for example, as used in smartphone and tablet computing devices). The computing devices 505 may also be equipped with communications and networking hardware and may be capable of communicating using any communications protocol. Further, the computing devices 505 may be equipped with input/output devices (not shown) that may include a display, a touchscreen-based or keyboard-based input device or speakers. Additionally, the computing devices 505 may include any type of memory, such as static or dynamic memory, and a power source or a power adapter. Aside from their hardware capabilities, the computing devices 505 may be configured to run or execute an operating system and/or other programs, and the computing devices' 505 associated memory may store executable instructions that, when executed by one or more processor, cause one or more functions to be performed or cause the operating system and/or other programs to run. Although only two devices are shown in FIG. 5, any number of devices may be contemplated in various embodiments. Further, the computing devices 505 may communicate with the computing resource service provider 510 or any entity of the computing resource service provider 510 via a network (not shown). The network may be public or private, whereby examples of the network include the Internet and an Internet service provider (ISP) network.

The computing devices 505 may collectively or individually be associated with a user or a customer (not shown) of the computing resource service provider 510 or its entities and functions. The customer may be an organization that may utilize one or more of the services provided by the computing resource service provider 510 to maintain and deliver information to its employees, which may be located in various geographical locations. Additionally, the customer may be an individual that utilizes the services of the computing resource service provider 510 to deliver content to a working group located remotely.

The computing resource service provider 510 includes a front-end system 504 and a document management and collaboration system 506 as well as a plurality of services and systems as shown in FIG. 5. These services and systems include a content distribution edge network 515, an object-level data storage service 514, a virtual computing service 516, a task management and workflow service 518, a managed directory service 555, a custom search service 554, a scalable database service 556, and a notification service 558. It is noted that in various embodiments, the computing resource service provider 510 may include fewer services and systems other than those described with reference to FIG. 5 or may include additional or alternative services or systems to those described with reference to FIG. 5. Further, in alternative embodiments, the systems and services may be utilized outside the context of the computing resources service provider 510. For example, the services and systems may be stand-alone or used in conjunction with systems and services other than those described with reference to FIG. 5.

The front-end system 504 may be a gateway to the document management and collaboration system 506 and may offer private and public services to users or customers and their computing devices 505. Access to the front-end system 504 may require authorization or user authentication. In addition, a device or user privilege level may govern access to the front-end system 504 and any data exchanges between the front-end system 504 and the computing devices 505. Access to the front-end system 504 may be governed by a user privilege level associated with a computing device 505 or a user privilege level or credential given to the computing device 505 or a user of the computing device 505, for example, by a group or organization administrator.

The front-end system 504 may perform authentication of a customer, a user, or a device before granting access to the resources of the document management and collaboration system 506. The authentication may be based on credentials, such as username and password information, or access tokens, among others. The front-end system 504 may provide services and interfaces that permit or enable customer access. For example, the front-end system 504 may enable a web-based platform or a console-based platform that provides information related to the services of the computing resource service provider 510 to the customer. Further, the front-end system 504 may enable the customer to execute applications or tasks in the computing resource service provider 510, track and manage the execution of the applications or tasks, receive the results of the execution, and transmit the results to user devices. As further described herein, the front-end system 504 may be the gateway by which the customer or its associated computing devices 505 may utilize the plurality of services provided by the computing resource service provider 510.

The document management and collaboration system 506 enables and manages the execution and processing of documents for collaboration between one or more users in a distributed system. The document management and collaboration system 506 may, for example, enable uploading documents to the computing resource service provider 510 and retain and modify metadata associated with the documents. The document management and collaboration system 506 may further allow for search functions associated with the documents or their metadata as well as collaborations between users on the documents.

Although the term "document" is used herein to describe objects produced or collaborated on by users of the computing resource service provider 510, the term "document" is not limited to media, such as audio-visual media. A document may be a computer file that is capable of being produced by or edited or viewed using a productivity program or suite. Accordingly, the document may be editable or non-editable text, images, drawings, and websites, among others.

The content distribution edge network 515 of the computing resource service provider 510 may be a collection of computing devices and other resources collectively configured to deliver content, such as web content, to a plurality of users. The content distribution edge network 515 may have a plurality of edge locations, for example, that are distributed in world-wide locations that are strategically placed to optimize user data throughput and minimize latency. The content distribution edge network 515 may receive requests for content and deliver the requested content to users. The content distribution edge network 515 may interface with a storage service that stores a portion or all of the content and may cause the content to be retrieved and provided to a requesting party. The content distribution edge network 515 may be utilized to enable user-accessible websites or web applications of the front-end system 504.

The object-level data storage service 514 may be a collection of computing resources configured to synchronously process requests to store and/or access data. The object-level data storage service 514 may operate using computing resources (e.g., databases) that enable the object-level data storage service 514 to locate and retrieve data quickly, so as to allow data to be provided in response to requests for the data. For example, the object-level data storage service 514 may maintain stored data in a manner such that, when a request for a data object is retrieved, the data object can be provided (or streaming of the data object can be initiated) in response to the request. As noted, data stored in the object-level data storage service 514 may be organized into data objects. The data objects may have arbitrary sizes except, perhaps, for certain constraints on size. Thus, the object-level data storage service 514 may store numerous data objects of varying sizes. As described herein, the object-level data storage service 514 may store any type of document (for example, document source files), underlays, previews, thumbnails, extracted document text, annotation indices, or truth tables.

The virtual computing service 516 may be a collection of computing resources configured to instantiate virtual machine instances on behalf of an entity of the computing resource service provider 510 (such as the document management and collaboration system 506) or on behalf of a customer. A party may interact with the virtual computing service 516 (via appropriately configured and authenticated API calls) to provision and operate virtual computer systems that are instantiated on physical computing devices hosted and operated by the virtual computing service 516. The virtual computing systems 516 may be used for various purposes, such as to operate as servers supporting a website, to operate business applications, or, generally, to serve as computing power. Further, the virtual computer systems may be used to support database applications, electronic commerce applications, business applications, and/or other applications. Although the virtual computing service 516 is shown in FIG. 5, any other computer system or computer system service may be utilized, such as a computer system or computer system service that does not employ virtualization or instantiation and instead provisions computing resources on dedicated or shared computers/servers and/or other physical devices.

The task management and workflow service 518 may be a collection of computing devices and other resources collectively configured to perform task coordination and management services that enable executing computing tasks across a plurality of computing environments and platforms. The task management and workflow service 518 tracks the progress of workflow execution and performs the dispatching and holding of tasks. Further, the task management and workflow service 518 may control the assignment of hosts or physical or virtual computing machines used for executing the tasks. A user may define a workflow for execution, whereby the workflow may include one or more tasks. The workflow may be defined using an application programming interface (API) configured function call to the task management and workflow service 518. Further, the user may specify task order for the workflow, conditional flows, and timeout periods for restarting or terminating the execution of the workflow. In addition, execution loops for the workflow may be defined. As described herein, workflow execution may by asynchronous and may be preceded by synchronous execution of database writes.

The managed directory service 555 may be a collection of computing devices and other resources collectively configured to serve as a directory that enables users to log on to computing resources of the computing resource service provider 510 using one set of credentials, and to enable administrators to uniformly apply security policies to the computing resource service provider 510. The managed directory service 555 may enable a web-based console for user and group management, and may be used as an authentication system for user credentials.

The custom search service 554 may be a collection of computing devices and other resources collectively configured to permit customized searches of data sets and enable establishing security or authentication requirements on a party performing a search. Further, the custom search service 554 allows for data set replication to enable consistent performance in the case of outages. As described herein, the customer search service 554 may be utilized for maintaining a search index of customer documents and their associated metadata. Further, to ensure consistent performance the searchable metadata or customer documents may be replicated to ensure consistent performance and guard against outages.

The scalable database service 556 may be a collection of computing devices and other resources collectively configured to provide a structured storage system that facilitates the storage and retrieval of documents or data. The scalable database service 556 may be non-relational and may be based on a key-value model. Examples of the scalable database service 556 include a NoSQL database (for example, to be distinguished from a relational structured query language (SQL) database). The scalable database service 556 may be used to store metadata associated with documents or users. For example, the scalable database service 556 may store metadata for underlays, overlays, documents, feedback, or comments. In addition, the scalable database service 556 may store metadata associated with users, organizations, and permissions. As a non-relational database, the scalable database service 556 may guarantee atomic writes to a single item in a single table. Accordingly, a single write may be synchronously performed to a truth table and remaining writes may be performed asynchronously using workflows.

In the environment illustrated in FIG. 5, a notification service 558 is included. The notification service 558 may comprise a collection of computing resources collectively configured to provide a web service or other interface and browser-based management console. The management console can be used to configure topics for which customers seek to notify applications (or other users), subscribe clients to the topics, publish messages, or configure delivery of the messages over the clients' protocol of choice (i.e., hypertext transfer protocol (HTTP), e-mail and short message service (SMS), among others). The notification service 558 may provide notifications to clients using a "push" mechanism without the need to periodically check or "poll" for new information and updates. As discussed above, the notification service 558 may send a push notification to one or more of the computing devices 505. When the client running on the device receives the notification, the selected documents may be deleted from the device. The notification service 558 may further be used for various purposes, such as monitoring applications that are being executed in the virtual computing service 516, workflow systems, time-sensitive information updates, mobile applications, and many others.

Figure 6:
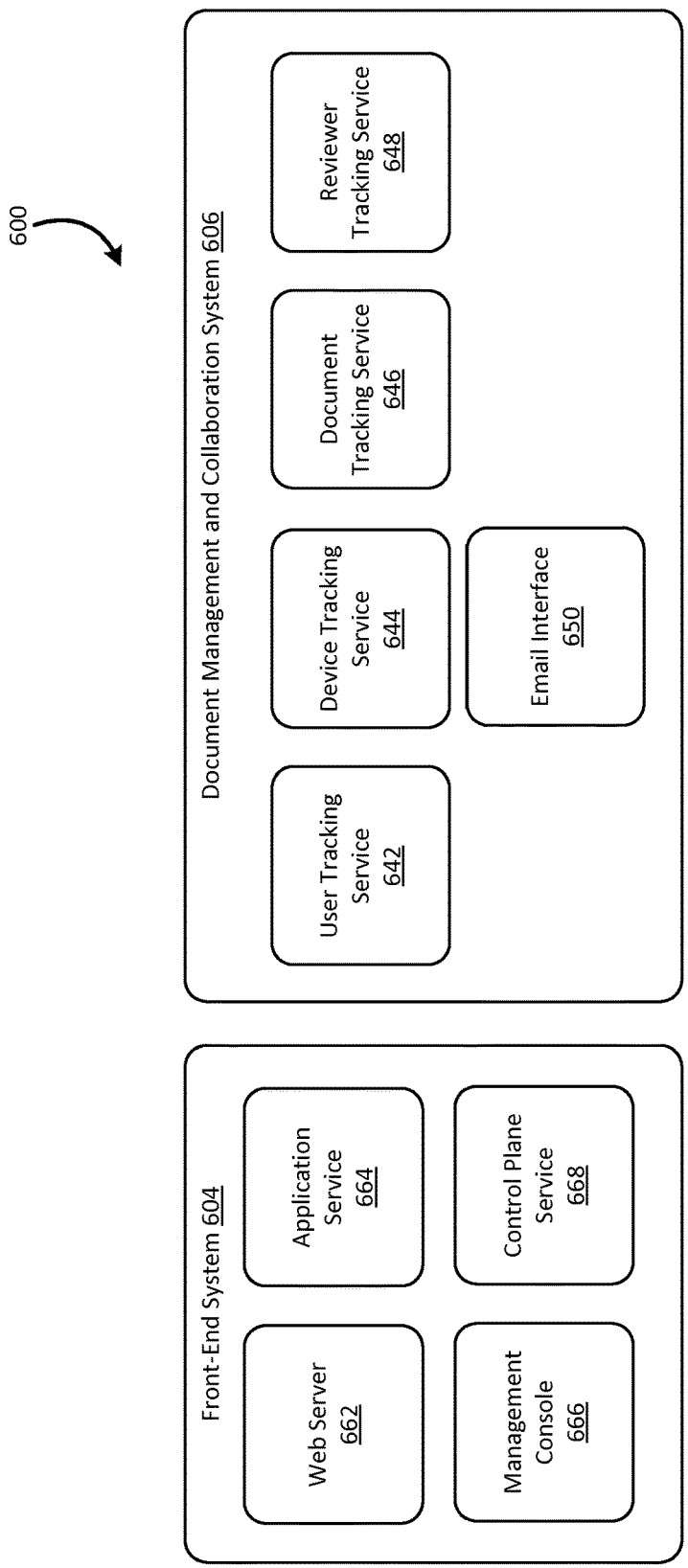
FIG. 6 shows a user device in communication with a computing resource service provider in accordance with at least one embodiment.

FIG. 6 shows the functional entities of the front-end system and the document management and collaboration system in accordance with at least one embodiment. The front-end system 604 includes a web server 662, an application service 664, a management console 666, and a control plane service 668. The web server 662 may enable the execution of a website, a single-page web application, or a single-page interface that permits a user to transmit or upload documents to the document management and collaboration system 606 and manage the documents. The web server 662 may further enable the user (not shown) to view and edit documents, underlays, or overlays, and provide commentary or feedback on the documents. The web server 662 may also enable an administrator or a user to set permissions or share modes that specify the privileges given to a user in accessing documents. In addition, the web server 662 may enable users or devices (not shown) to submit authentication or authorization credentials. The content distribution edge network, described with reference to numeral 512 in FIG. 5, may be used to distribute content of the web server 662. The actions performed by the user may be done via a website, an application, or a management console, and the web server 662 may enable executing the website, application, or management console. Although one web server 662 is described with reference to FIG. 6, it may be contemplated that multiple web servers of any type may be used, whereby a portion of the web servers may be redundant.

The application service 664 may be a collection of computing devices and other resources collectively configured to serve as a user-exposed service that receives requests from the user and services the requests. A user request may be made using a website or a management console accessible to the user or a client application that is executed on a user's device may make service requests on behalf of the user. The request may be an API function call, and the application service 664 may process the request and manage its execution. The application service 664 may cause the synchronous execution of actions associated with a received request, or alternatively may cause one or more actions that require more complex processing to be queued for asynchronous execution. The application service 664 may also be responsible for receiving user credentials and request authentication of the user from an authentication service. To cause the performance of operations requested by the user, the application service 664 may make one or more function calls to services or entities of the computing resource service provider 510 of FIG. 5. For example, the application service 664 may request user or access-token validation from the managed directory service 555 or may cause search indices maintained by the custom search service 554 to be updated.

In addition to authentication, the application service 664 may also be configured to receive hardware and/or software configuration information for a user device and uniquely identify and track the user device using this information. Using the identification of the user and the tracking of the user device, a downloaded document may be deleted or otherwise made unavailable on the user device. In one embodiment, the application service 664 may cause a targeted deletion of the downloaded document from the user device.

The management console 666 may be a collection of computing devices and other resources collectively configured to permit organizations, administrators, and users to register for utilizing document management and collaboration services. The management console 666 may be used in addition or as an alternative to a website or an application running on a user device, and may permit users and administrators to make service requests using appropriately configured API function calls. For example, the management console 666 may be used for inviting a user to join a document collaboration system and view and collaborate on documents. Further, the management console 666 may be used for allowing dashboard access, audit log access, permission settings (for example, for administrators and users), storage limit settings (for example, for organizations and users), and security settings (for example, passwords and encryptions).

The control plane service 668 of the front-end system 604 may be a collection of computing devices and other resources collectively configured to serve as an interface that enables creating new computing instances for document collaboration and management. Instances may be created by transparently creating a directory in the managed directory service 555 of FIG. 5 or associating an existing directory (for example, maintained by the managed directory service 555 or by a user or administrators) for document management and collaboration. The control plane service 668 may be utilized to create a document directory, and the document directory may be executed and served by the managed directory service 555. The document directory may be associated with an organization having an administrator that is capable of providing permissions and privileges to users. Following the creation of the directory, the application service 664 may be used to enable functions affecting folders or documents of the directory.

The document management and collaboration system 606 includes a user tracking service 642, a device tracking service 644, a document tracking service 646, a reviewer tracking service 648, and an email interface 650. The user tracking service 642 may be a collection of computing devices and other resources collectively configured to track users and user sessions. The device tracking service 644 may be a collection of computing devices and other resources collectively configured to track user devices.

The document tracking service 646 may be a collection of computing devices and other resources collectively configured to track various documents and which users and which documents have been downloaded or accessed the documents. The reviewer tracking service 648 may be a collection of computing devices and other resources collectively configured to track reviewers of documents and track document review activities for the documents. The email interface 650 may be a collection of computing devices and other resources collectively configured to interface with email clients and email systems. The email interface 650 may receive requests for information pertaining to documents and review status, and may return the requested information.

Figure 7:
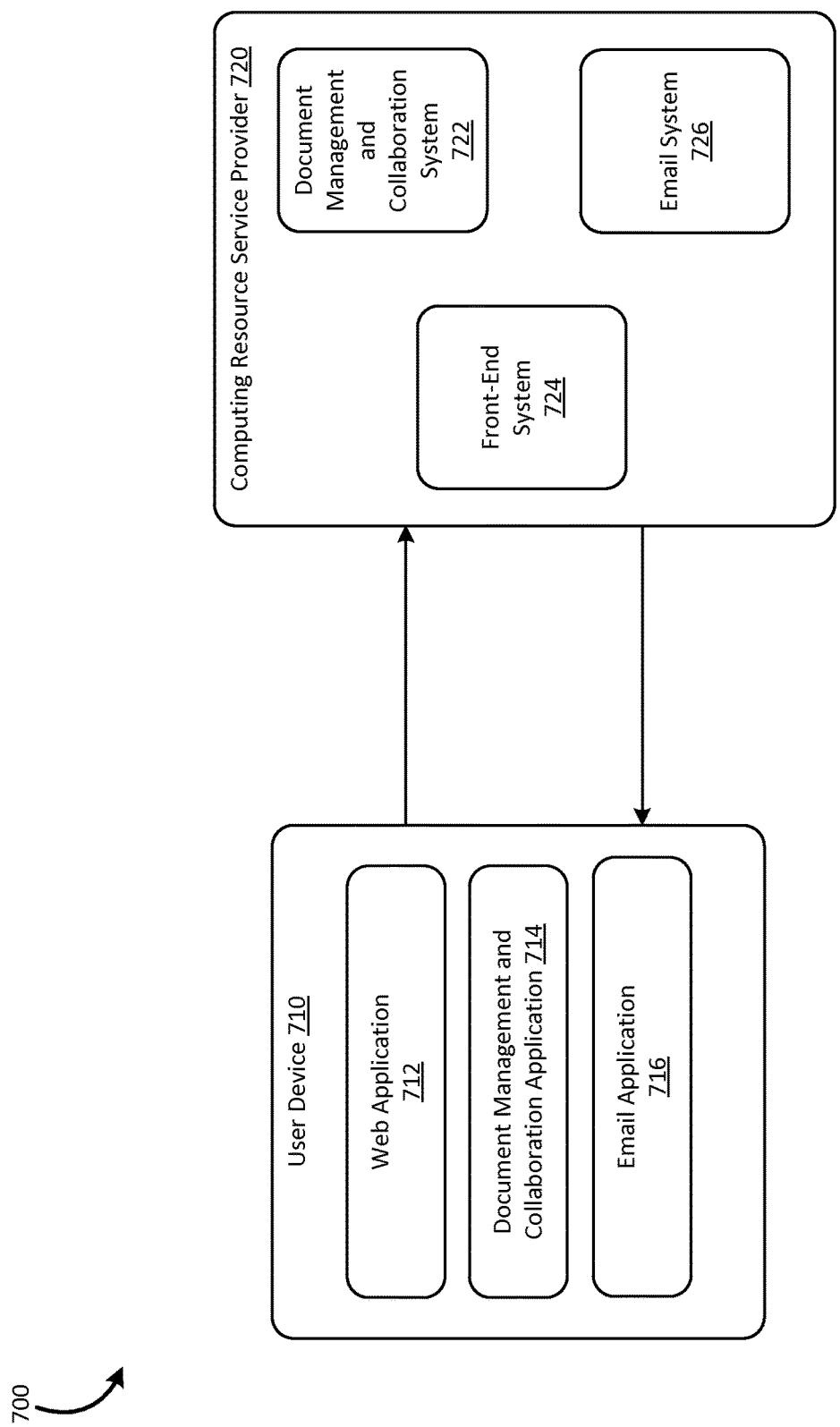
FIG. 7 shows a user device in communication with a computing resource service provider in accordance with at least one embodiment.

FIG. 7 shows a user device 710 in communication with a computing resource service provider 720 having a document management and collaboration system 722 and email system 726 in accordance with at least one embodiment. In the environment 700, the user device 710 includes a web application 712, and a document management and collaboration application 714, and an email client application 716. The computing resource service provider 720 includes a document management and collaboration system 722, such as the document management and collaboration system described with reference to document management and collaboration system 606 in FIG. 6. It is noted that the computing resource service provider 720 may include entities in addition to or in place of those shown in FIG. 7, such as the entities described with reference to FIGS. 5 and 6.

As described herein, the user device 710 may be equipped with a collection of computing devices and other resources collectively configured to communicate with the computing resource service provider 720 or any one of its entities. The user device 710 may be equipped with any number or type of communication devices, such as ports or modems that enable any type of wireless or wired connectivity. Further, the communication may be performed over any type of network (not shown), such as Internet protocol (IP) networks including the Internet, an intranet, or an Internet service provider (ISP) network. In addition, the user device 710 may communicate in accordance with or in compliance with any type of communications protocol including any one of the Institute for Electrical and Electronics Engineers (IEEE) 802 protocols, a short-range communications protocol, such as Bluetooth™, or a cellular communications protocol, such as a third generation (3G) communications protocol or long-term evolution (LTE).

The web application 712 may enable the user device 710 to render and cause the display of a website and interact with the website. An example of the web application 712 includes a web browser, and the web application 712 may permit a user to supply log in credentials to a document collaboration and management website and access one or more document directories of folders. Further, the web application 712 may enable the user, for example, via a website, to navigate between folders or directories for which the user has at least viewing privileges, for example, based at least in part on the user's credentials. In addition, the website may provide the user with the option of uploading or transmitting a document to be included in a folder or to be shared, commented upon, or annotated by the user or one or more other collaborators.

Actions performed by the user in interacting with a website may cause the web application 712 to send requests to the computing resource service provider 720 or its entities. The requests may be application programming interface (API) function calls that are executed by the computing resource service provider 720. For example, when a user annotates a document version and saves the annotated version, the web application 712 may cause an API function call to be made that indicates the annotations to the computing resource service provider 720 or its entities. In some embodiments, the web application 712 may not be fully synchronous and may not cause a request to be made based on any action taken by the user. For example, as the user annotates a document, the web application 712 may not relay the annotations synchronously as they are made by the user and may instead only relay the annotations when the user saves the document or the annotations or, alternatively, every time interval.

As shown in FIG. 7, the user device 710 is further equipped with a document management and collaboration application 714. The document management and collaboration application 714 may be executable instructions (for example, that are stored on a non-transitory computer-readable storage medium on the user device 710 or coupled to the user device 710) that, when executed by a computer system of the user device 710, enable user interaction with the document sharing and collaboration functionality provided by the computing resource service provider 720. As with a web application-based or a browser-based interface, the document management and collaboration application 714 enables the user to supply log in credentials and access one or more document directories or folders. The user may also interact with a document management and collaboration system 722 provided by the computing resource service provider 720 by, for example, uploading a document to one or more folders, opening a document from one or more folders, and editing or annotating a document. The document management and collaboration application 714 may provide a mechanism for utilizing any document collaboration and management resources and functionalities that is independent of the web application 712.

The user device 710 may also include an email application 716 that communicates with the front-end system 724 and the document management and collaboration system 722. The email system 726 may receive requests from email client application 716 for information pertaining to documents associated with document management and collaboration system 722 and their review statuses. The request may include a unique document identifier and/or identifiers for reviewers. The email system 726 may cause the identified information to be provided to email client application 716.

Figure 8:
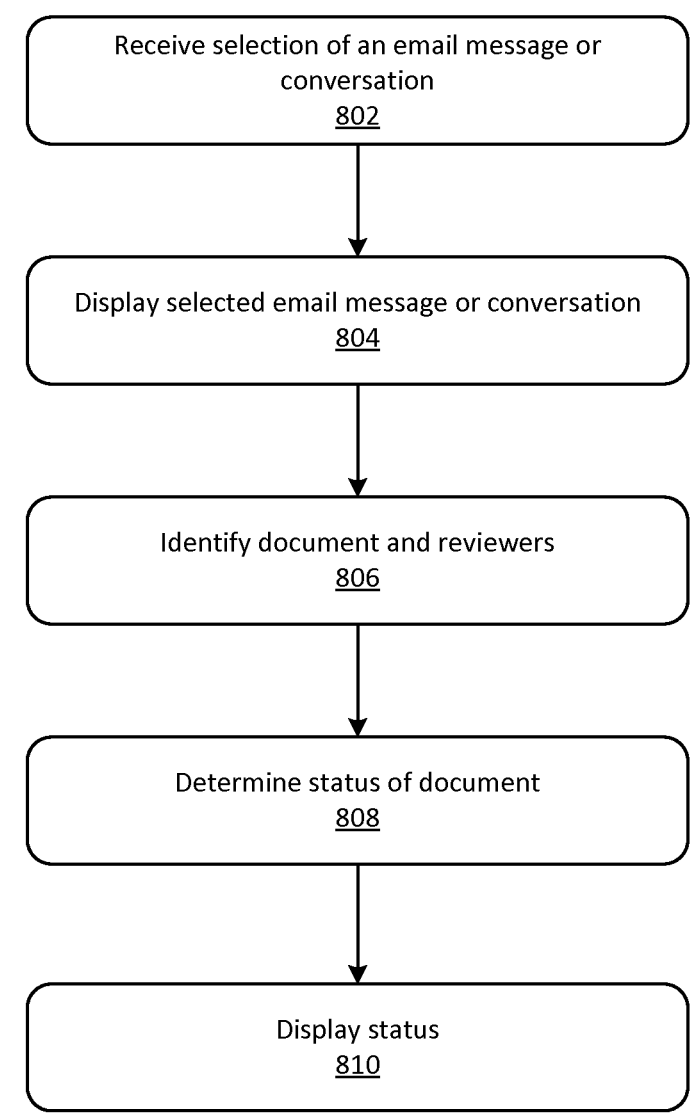
FIG. 8 shows an example of a method for showing a review system in accordance with at least one embodiment.

FIG. 8 shows an example of a method for providing information in an email environment in accordance with at least one embodiment described herein. In the process 800, an application service, such as application service 664 of FIG. 6, process 802 illustrates receiving a selection of an email message or conversation from a user of an email account. The request may be received from an email client, and the email message may include an attached document of a document management and collaboration system. In the process 804, the selected email message or conversation is displayed. The display may include a user-selectable control for requesting the status of the attached document.

In the process 806, in response to receiving an input via the user-selectable control, the attached document and reviewers who are associated with the attached document are identified. In process 808, for each of the reviewers, a respective review and editing status of the attached document within the document management and collaboration system is determined. In process 810, information for display, by the email client, is provided to the email client. The information may include the determined respective review and editing status for each of the reviewers.

The review and editing status may include, for example, status indications that may be used to indicate to what extent a document has been reviewed, such as "reviewed," "opened," "not reviewed," or "approved." Furthermore, the review and editing status from the document management and collaboration system may be updated as updated information becomes available. For example, if the user has the feedback tracking panel open for some time and a reviewer has provided additional feedback on the document for which the feedback tracking panel is relevant, then this updated information may automatically be refreshed on the feedback tracking panel.

In some embodiments, the identities of the reviewers of the document are received from the document management and collaboration system. For example, the email system may simply provide an identifier for a document, and the document management and collaboration system may identify users who have reviewed the document and may return the identities of the reviewers along with their review statuses.

An option to initiate composition of an email to a selected one of the reviewers may be provided via the display of the status. For example, a user may wish to send a message to one of the reviewers that are listed on the feedback tracking panel, and may be provided an ability to launch a new message to the user by clicking on the name of the user, or using some other user-selectable option.

The status pertaining to review and editing of additional documents within the document management and collaboration system may be provided. For example, if a second document is attached to the open email or email conversation, then a second user selectable control may be provided to open a feedback tracking panel for the second document. The status of the second document may be displayed within the feedback tracking panel, including review and editing status for reviewers associated with the second document.

Some of the information may be received via an application programming interface (API) configured to receive first electronic messages that encode identifiers indicative of a request for the status of the attached document. The API, in response to receiving one of the first electronic messages, may be configured to send second electronic messages indicative of information pertaining to the request.

The document management and collaboration system and the email system may be integrated with or utilized in conjunction with other services, such as a virtual desktop service that enables users to execute one or more virtual desktops using distributed computing resources. For example, the various file or document directories of the virtual desktop may be maintained by the document management and collaboration system. Using the document management and collaboration system, a user may be able to access various document directories of the user's virtual desktop or virtual operating system. The access may be performed without a need to independently access the virtual desktop or operating system or the virtual desktop service. Accordingly, when the document management and collaboration system is integrated with virtual desktop service, the directories, documents, or folders maintained by the virtual desktop service may be accessible via the document management and collaboration system.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 9:
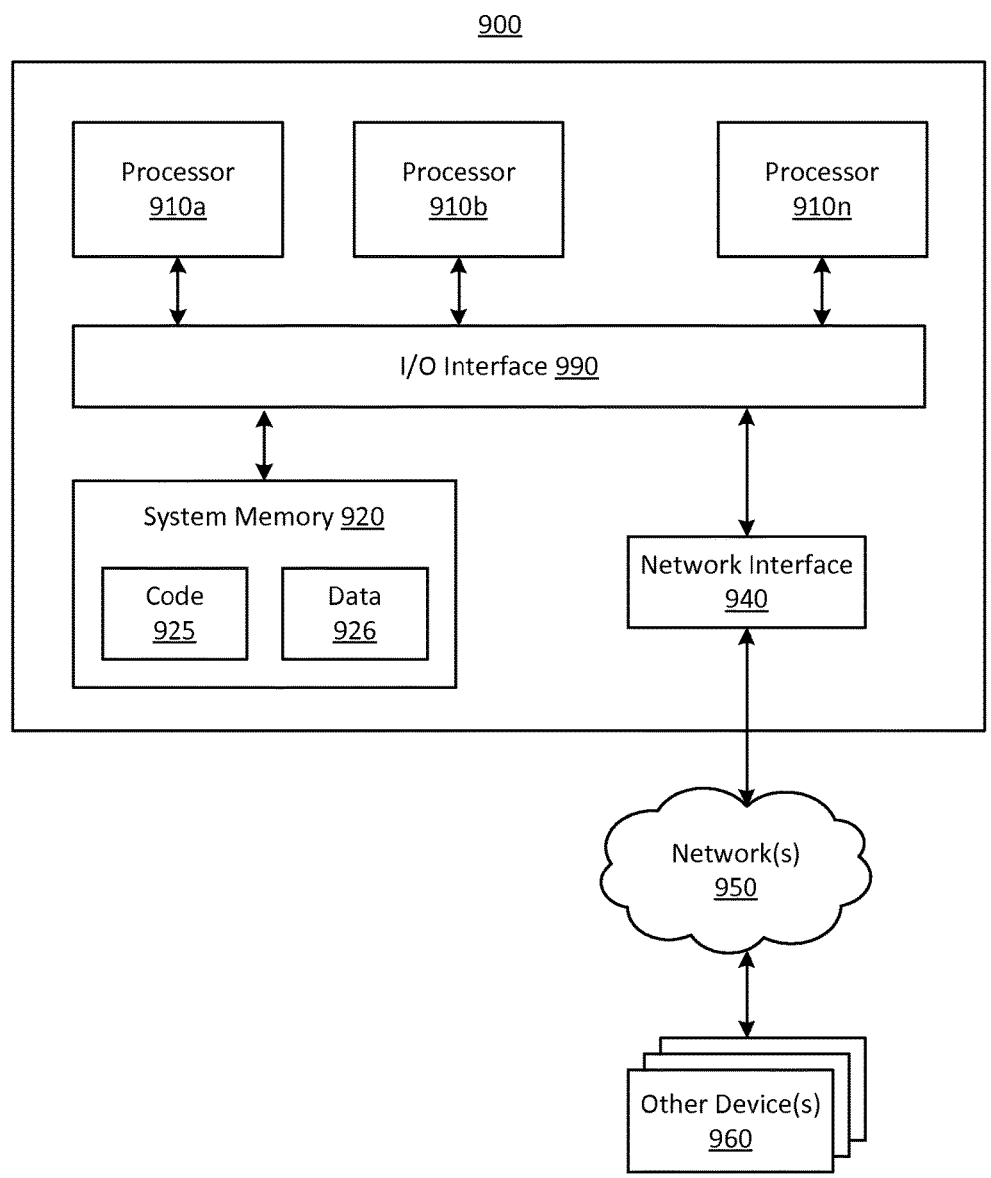
FIG. 9 depicts an example computing system that may be used in some embodiments.

In at least some embodiments, a server or other computing device that implements a portion or all of one or more of the technologies described herein, including the techniques to implement the functionality described herein in reference to client devices 420*a*-*c* and email service 430 may include a general-purpose computer system that includes or is configured to access one or more computer-accessible media. FIG. 9 illustrates such a general-purpose computing device 900. In the illustrated embodiment, computing device 900 includes one or more processors 910*a*, 910*b*, and/or 910*n* (which may be referred herein singularly as "a processor 910" or in the plural as "the processors 910") coupled to a system memory 920 via an input/output (I/O) interface 990. Computing device 900 further includes a network interface 940 coupled to I/O interface 990.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 990 may be configured to coordinate I/O traffic between processor 910, system memory 920, and any peripheral devices in the device, including network interface 940 or other peripheral interfaces. In some embodiments, I/O interface 990 may perform any necessary protocol, timing, or other data transformations to convert data signals from one component (e.g., system memory 920) into a format suitable for use by another component (e.g., processor 910). In some embodiments, I/O interface 990 may include support for devices attached through various types of peripheral buses, such as a variant of the Peripheral Component Interconnect (PCI) bus standard or the Universal Serial Bus (USB) standard, for example. In some embodiments, the function of I/O interface 990 may be split into two or more separate components, such as a north bridge and a south bridge, for example. Also, in some embodiments some or all of the functionality of I/O interface 990, such as an interface to system memory 920, may be incorporated directly into processor 910.

Network interface 940 may be configured to allow data to be exchanged between computing device 900 and other device or devices 960 attached to a network or network(s) 950, such as other computer systems or devices as illustrated in FIGS. 3-7, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fibre Channel SANs or via any other suitable type of network and/or protocol.

In some embodiments, system memory 920 may be one embodiment of a computer-accessible medium configured to store program instructions and data as described above in connection with FIGS. 1 and 2 for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 900 via I/O interface 990. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 900 as system memory 920 or another type of memory. Further, a computer-accessible medium may include transmission media or signals, such as electrical, electromagnetic, or digital signals, conveyed via a communication medium, such as a network and/or a wireless link, such as may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

Figure 10:
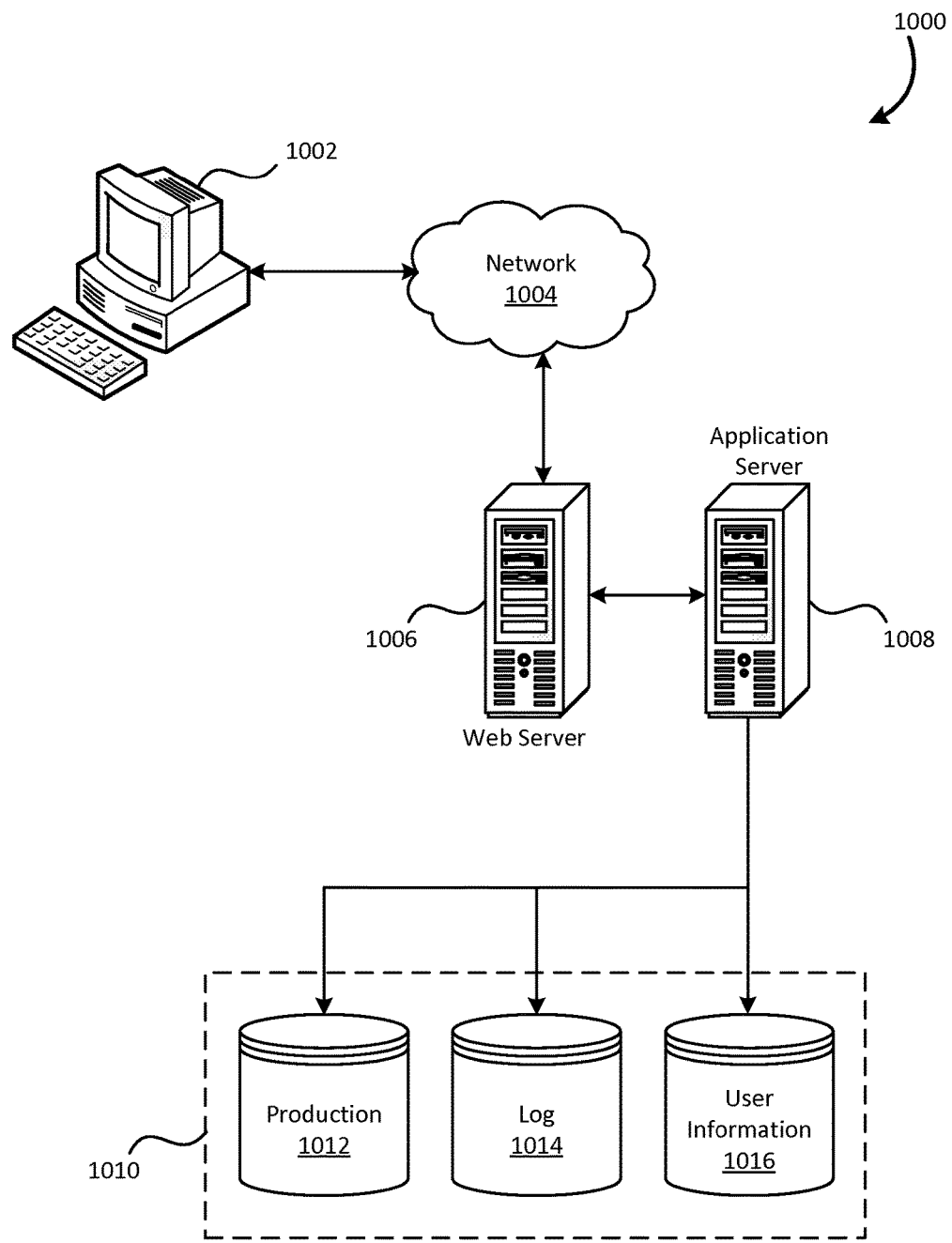
FIG. 10 depicts an example computing system that may be used in some embodiments.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, any other such network, and/or any combination thereof. Components used for such a system can depend at least in part upon the type of network and/or environment selected. Protocols and components for communicating via such a network are well-known and will not be discussed herein in detail. Communication over the network can be enabled by wired or wireless connections and combinations thereof. In this example, the network includes the Internet, as the environment includes a web server 1006 for receiving requests and serving content in response thereto; although for other networks, an alternative device serving a similar purpose could be used, as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks, such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language (HTML), Extensible Markup Language (XML), JavaScript, Cascading Style Sheets (CSS), or another appropriate client-side structured language. Content transferred to a client device may be processed by the client device to provide the content in one or more forms including, but not limited to, forms that are perceptible to the user audibly, visually, and/or through other senses including touch, taste, and/or smell. The handling of all requests and responses, as well as the delivery of content between the electronic client device 1002 and the application server 1008, can be handled by the web server using PHP: Hypertext Preprocessor (PHP), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the illustrated data store 1010 may include mechanisms for storing production data 1012 and user information 1016, which can be used to serve content for the production side. The data store 1010 is also shown to include a mechanism for storing log data 1014, which can be used for reporting, analysis, or other such purposes. It should be understood that there can be many other aspects that may need to be stored in the data store, such as page image information and access rights information, which can be stored in any of the above-listed mechanisms as appropriate or in additional mechanisms in the data store 1010. The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system (CMS) operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices, which can be used to operate any of a number of applications. User or client devices can include any of a number of general-purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes, such as development and database management. These devices also can include other electronic devices, such as dummy terminals, thin-clients, gaming systems, and other devices capable of communicating via a network. These devices also can include virtual devices, such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS) and APPLETALK. The network can be, for example, a local area network, a wide-area network, a virtual private network, the Internet, an intranet, an extranet, a public-switched telephone network, an infrared network, a wireless network, a satellite network, and any combination thereof.

In embodiments utilizing a web server, the web server can run any of a variety of server or mid-tier applications, including Hypertext Transfer Protocol (HTTP) servers, FTP servers, Common Gateway Interface (CGI) servers, data servers, Java® servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU or processor), at least one input device (e.g., a mouse, keyboard, controller, touchscreen, or keypad), and at least one output device (e.g., a display device, printer, or speaker). Such a system may also include one or more storage devices, such as disk drives, optical storage devices, and solid-state storage devices, such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices, such as network input/output devices, may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information, such as computer-readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage or other magnetic storage devices, or any other medium that can be used to store the desired information and that can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Various embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for providing information in an email environment, the method comprising:
   under control of one or more computer systems configured with executable instructions,
      receiving, from an email client, a selection of an email message from a user of an email account, the email message including a plurality of attached documents of a document management and collaboration system, wherein the email message is rendered on a display within the email client;
      identifying the plurality of attached documents and a plurality of groups of reviewers, each group of reviewers comprising reviewers associated with a respective one of the plurality of attached documents;
      determining, for each of the reviewers in each of the plurality of groups of reviewers, a respective review and editing status of the respective one of the plurality of attached documents within the document management and collaboration system; and
      providing, to the email client, information for display, by the email client, in one or more panels that include the respective review and editing status for each of the reviewers in each of the plurality of groups of reviewers for each of the plurality of attached documents.

2. The computer-implemented method of claim 1, wherein the respective review and editing status is indicative of one or more of reviewed, opened, not reviewed, or approved.

3. The computer-implemented method of claim 1, further comprising updating each respective review and editing status from the document management and collaboration system as updated information becomes available.

4. The computer-implemented method of claim 1, wherein the identities of the reviewers of each attached document are received from the document management and collaboration system.

5. The computer-implemented method of claim 1, further comprising causing display of a user interface element for initiating composition of an email to a selected one of the reviewers via a display of the review and editing status of the selected one of the reviewers.

6. The computer-implemented method of claim 1, wherein the email message comprises a link to a location of each attached document in the document management and collaboration system, and wherein each attached document is not stored with the email message.

7. The computer-implemented method of claim 1, wherein each attached document is stored with the email message.

8. A system, comprising one or more computing devices including one or more hardware-based processors, the one or more computing devices configured to implement an application service configured to:
   provide information for displaying an email message within an email client, wherein a plurality of attached documents are attached to the email message;
   identify reviewers in each of a plurality groups of reviewers, each group of reviewers associated with a respective one of the plurality of attached documents;
   determine status information indicating an extent to which the respective one of the plurality of attached documents has been reviewed by each reviewer in each respective group of reviewers; and
   provide the status information to the email client that displays the status information in one or more panels.

9. The system of claim 8, wherein the status information comprises a fraction or percentage indicator.

10. The system of claim 8, wherein the application service is further configured to update the status information as updated information becomes available from a document management and collaboration system.

11. The system of claim 8, wherein identity of each reviewer is received from a document management and collaboration system.

12. The system of claim 8, wherein the email client is running in a web browser on a computing device remotely located from the application service.

13. The system of claim 8, wherein the application service is operated separately from a document management and collaboration system.

14. The system of claim 8, wherein the email message comprises a link to each attached document, the link having been provided by a document management and collaboration system.

15. A non-transitory computer-readable storage medium having stored thereon executable instructions that, when executed by one or more processors of a computing device, cause the computing device to:
   generate a user interface operable to display a selected email message wherein a plurality of documents are attached to the selected email message;
   determine a document review status for each reviewer in each of a plurality of groups of reviewers, each group of reviewers associated with a respective one of the plurality of documents; and
   render each determined document review status in one or more panels on the user interface.

16. The non-transitory computer-readable storage medium of claim 15, wherein each document review status is received from a document management and collaboration system.

17. The non-transitory computer-readable storage medium of claim 15, wherein the plurality of documents are stored in a document management and collaboration system.

18. The non-transitory computer-readable storage medium of claim 17, wherein each reviewer is a user of the document management and collaboration system.

19. The non-transitory computer-readable storage medium of claim 15, wherein each document review status is received via an application programming interface (API) configured to receive first electronic messages that encode identifiers indicative of a request for the document review status and send second electronic messages indicative of the document review status.

20. The non-transitory computer-readable storage medium of claim 15, wherein the executable instructions further cause the computing device to display a revised document review status based on additional information from a document management and collaboration system.

\* \* \* \* \*